May 20, 1930.  C. VON HOFE  1,759,529

OCULAR

Filed May 1, 1924

Fig. 1.

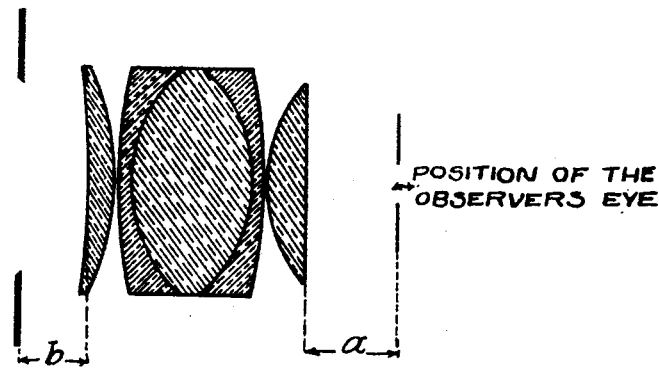

POSITION OF THE OBSERVERS EYE $r_1 = \infty$
$r_2 = +15.73693$    $d_1 = 4.0$    $D = 22.75$    Barion.    614/564
$r_3 = -52.0$    $d_2 = 0.1$
$r_4 = -15.0$    $d_3 = 1.5$                     Flint    673/320
$r_5 = +15.0$    $d_4 = 12.0$    $D = 22.75$    Barion    614/564
$r_6 = +52.0$    $d_5 = 1.5$                     Flint    673/320
$r_7 = -26.0$    $d_6 = 0.1$
$r_8 = -110.3418$    $d_7 = 3.0$    $D = 20$    Barion    614/564
$a = 9.3$
$b = 6.6$    focal length 15.75 mm.

Optical Properties of the Glasses:

Barion 614/564    Barium Crown : $n_D = 1.6139$    $v = 56.4$
Flint 673/320    Flint    : $n_D = 1.6733$    $v = 32.0$

Fig. 2.

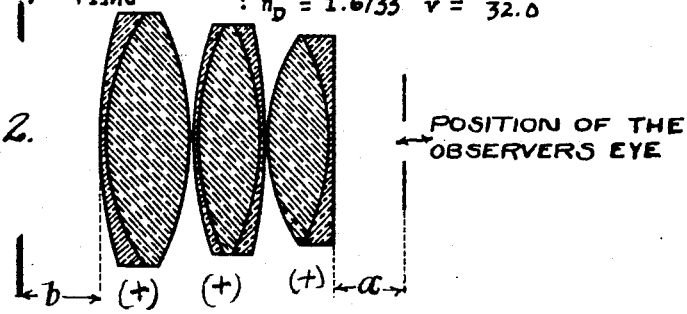

POSITION OF THE OBSERVERS EYE $r_1 = \infty$
$r_2 = +21.0$    $d_1 = 0.5$    Flint    649/338
$r_3 = -18.2$    $d_2 = 6.2$    Kron    516/640    $D = 20.5$
$r_4 = +50.0$    $d_3 = 0.1$
$r_5 = +25.0$    $d_4 = 0.5$    Flint    649/338
$r_6 = -25.0$    $d_5 = 6.5$    Kron    516/640    $D = 22.75$
$r_7 = -33.0$    $d_6 = 0.5$    Flint    649/338
$r_8 = +27.0$    $d_7 = 0.1$
$r_9 = -21.0$    $d_8 = 8.7$    Kron    516/640    $D = 25.0$
$r_{10} = -45.2$    $d_9 = 0.5$    Flint    649/338

Optical properties of the Glasses:
$a = 7.2$
$b = 8.0$    focal length 15.75mm
Flint 649/338: Flint : $n_D = 1.6489$    $v = 33.8$
Kron 516/640 : Crown: $n_D = 1.5162$    $v = 64.0$ Inventor:
CHRISTIAN VON HOFE By Edinger
Atty.

Patented May 20, 1930

1,759,529

UNITED STATES PATENT OFFICE

CHRISTIAN von HOFE, OF BERLIN-ZEHLENDORF, GERMANY, ASSIGNOR TO THE FIRM OPTISCHE ANSTALT C. P. GOERZ AKTIENGESELLSCHAFT, OF BERLIN, GERMANY

OCULAR

Application filed May 1, 1924, Serial No. 710,242, and in Germany May 5, 1923.

This invention relates to an ocular which shows the valuable property of a large field of view together with good correction.

The new ocular can be considered as an improvement on the known so-called orthoscopic oculars which comprise an element consisting of three cemented lenses and a further element on the eye side of the first mentioned element and at a distance of same which has a collecting effect. According to the invention the enlargement of the field of view of this known kind of oculars is secured in this manner that also on the image side of the cemented three-lens-element of the ocular a further collecting element is provided at a small distance from the three-lens-element and at a comparatively large distance from the focal plane adjacent to the ocular on the image side thereof which distance from said image plane should not be smaller than say ⅓ of the focal length of the ocular. The provision of the collecting lens on the image side of the cemented three-lens-element at only a small distance from the latter is necessary in order to make this additional element remarkably contribute to the elimination of the spherical aberrations. Such effect cannot be secured if the lens would be arranged at a greater distance from the intermediate cemented three-lens-element near the focal plane. The intermediate cemented three-lens-element preferably consists of a collecting lens having cemented thereto at each of its two faces a dispersing lens. This form of the intermediate compound element of the ocular affords the possibility to compensate the unfavourable influence which is exerted by the collecting element on the image side of the intermediate compound element, such unfavourable effect consisting particularly in an increase of the chromatic aberration.

The best results have been secured with simple collective lenses as the two outer elements of the ocular, although instead of simple lenses also cemented lenses could be used, particularly for that ocular-element which is positioned on the image side of the intermediate compound element, if it is intended to secure a particularly good chromatic correction. However, the use of cemented lenses for one or for both outer elements of the ocular has the effect of increasing the thickness of the ocular whereby the main point on the eye side of the ocular is displaced towards the inside of the glass mass which is not desirable.

In connection herewith I wish to mention a fundamental difference between an ocular and an objective in order to clearly distinguish my invention from former constructions of optical systems of objectives which are similar to my ocular construction as to the composition of the lens elements. An objective must be calculated so as to yield sharp images of corporeal objects. An ocular is destined to be coordinated to an objective, so that it only receives bundles of light limited by the aperture of the objective. In order to obtain a large field of view the ocular must be given a diameter which is larger than the aperture of the objective would require. Practically such an ocular must comprise lenses the diameter of which is larger than the focal length of the ocular.

Two examples of the new ocular are illustrated on the accompanying drawing, the data of which being given in the following schedules:

*Example 1*

$r_1 = \infty$
$r_2 = + 15.73693$
$r_3 = - 52.0$
$r_4 = - 15.0$
$r_5 = + 15.0$
$r_6 = + 52.0$
$r_7 = - 26.0$
$r_8 = -110.3418$ $d_1 = 4.0$   D=22.75   Barion   614/564
$d_2 = 0.1$
$d_3 = 1.5$              Flint    673/320
$d_4 = 12.0$  D=22.75   Barion   614/564
$d_5 = 1.5$              Flint    673/320
$d_6 = 0.1$
$d_7 = 3.0$   D=20      Barion   614/564

$a = 9.3$
$b = 6.6$ focal length 15.75 mm.

*Optical properties of the glasses*

Barion 614/564: Barium crown: $n_D=1.6139$ $v=56.4$
Flint 673/320: Flint: $n_D=1.6733$ $v=32.0$

*Example 2*

$r_1=\infty$
$r_2=+21.0$   $d_1=0.5$   Flint   649/338 ⎫
$r_3=-18.2$   $d_2=6.2$   Kron   516/640 ⎬ D=20.5
$r_4=+50.0$   $d_3=0.1$
$r_5=+25.0$   $d_4=0.5$   Flint   649/338 ⎫
$r_6=-25.0$   $d_5=6.5$   Kron   516/640 ⎬ D=22.75
$r_7=-33.0$   $d_6=0.5$   Flint   649/338 ⎭
$r_8=+27.0$   $d_7=0.1$
$r_9=-21.0$   $d_8=8.7$   Kron   516/640 ⎫
$r_{10}=-45.2$   $d_9=0.5$   Flint   649/338 ⎬ D=25.0

$a=7.2$
$b=8.0$   focal length 15.75 mm.

*Optical properties of the glasses*

Flint 649/338: Flint: $n_D=1.6489$ $v=33.8$
Kron 516/640: Crown: $n_D=1.5162$ $v=64.0$ In the above schedules the radii of the several lenses are designated successively with $r_1$, $r_2$ etc. beginning with the outermost surface of the ocular. $d_1$, $d_2$ etc. designate the thicknesses of the lenses, D the diameters.

The various kinds of glass of which use is made in the embodiments of the examples are available on the market. As an indication thereof the kinds of glass have been designated in conformity with the designation in the catalogue of their manufacturers, Sendlinger optische Glaswerke G. m. b. H of Berlin-Zehlendorf, Germany.

$a$ designates the distance of the outermost ocular surface from the focus of the ocular on the eye side and $b$ the distance of the focal plane from the adjacent glass surface of the ocular.

This distance being measured between the focal plane and the vertex of the adjacent lens surface of the ocular.

What I claim is:—

1. Ocular comprising a cemented three lens element and at each of its side at a distance therefrom a collecting element, the collecting element on the image side of the intermediate three lens element being so positioned that the distance of its vertex from the focal plane adjacent to it is at least one third of the focal length of the ocular and the collecting element lying on the eye-side of the intermediate three lens element facing the latter with a convex surface.

2. Ocular comprising a cemented three lens element and at each of its sides at a distance therefrom a collecting element, the collecting element on the image side of the intermediate three lens element being so positioned that the distance of its vertex from the focal plane adjacent to it is at least one third of the focal length of the ocular and the collecting elements facing the intermediate three lens element each with a convex surface.

In testimony whereof I have signed this specification.

CHRISTIAN von HOFE.